Figure 1:
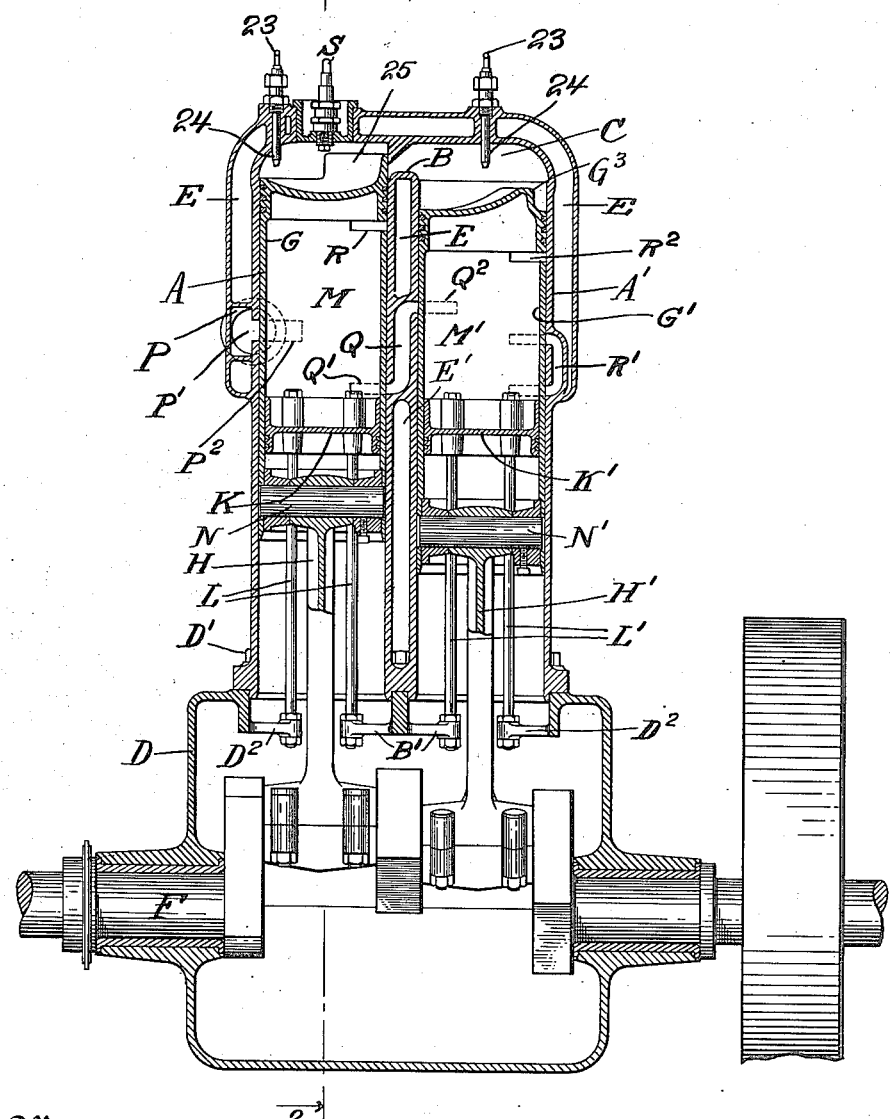

J. R. ROGERS.
INTERNAL COMBUSTION ENGINE.
APPLICATION FILED JULY 9, 1912.

1,239,523.

Patented Sept. 11, 1917.
5 SHEETS—SHEET 1.

Witnesses:
John Darby
W. M. Le Ard

Inventor
John R. Rogers
By his Attorney

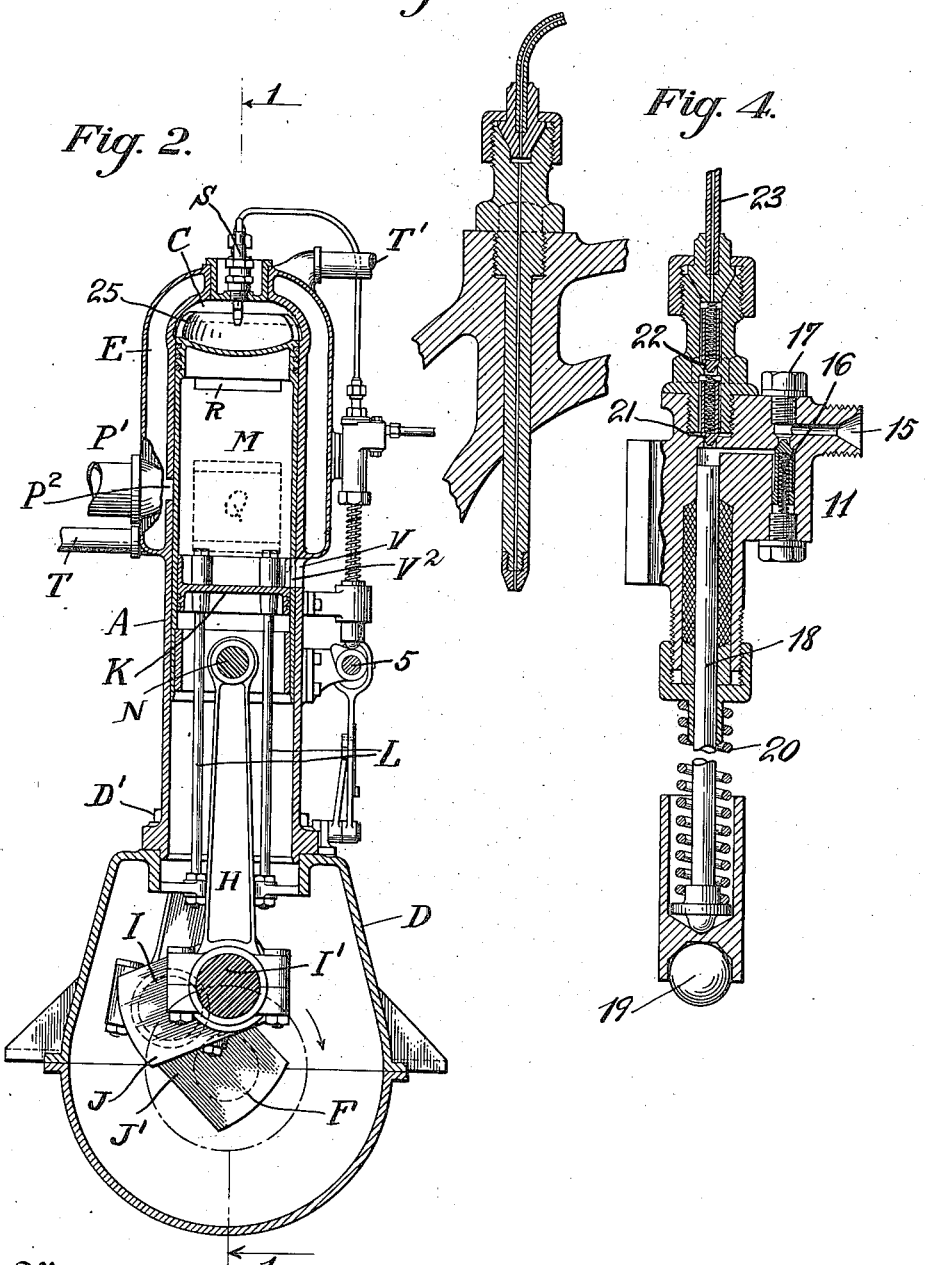

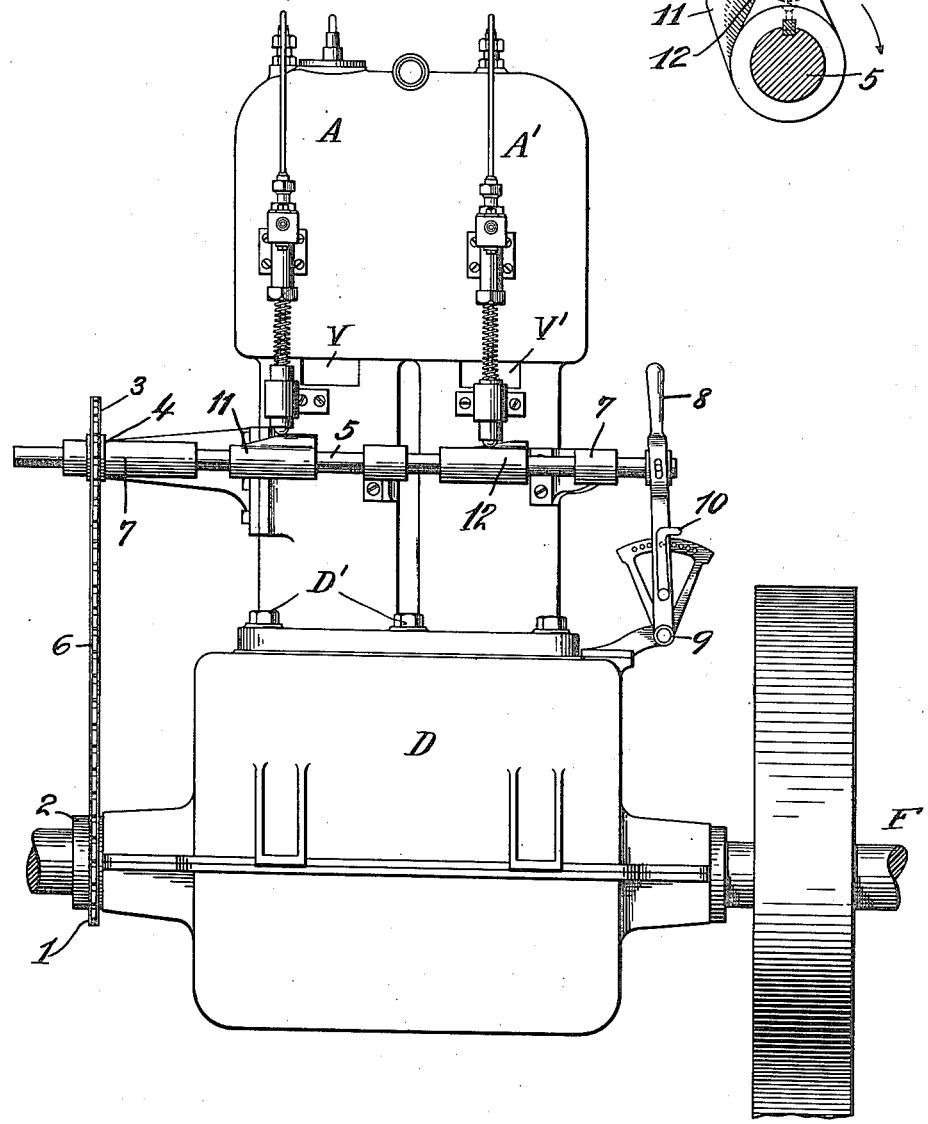
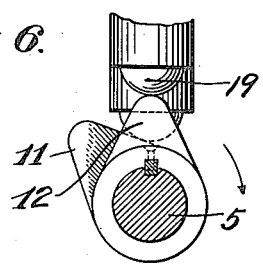

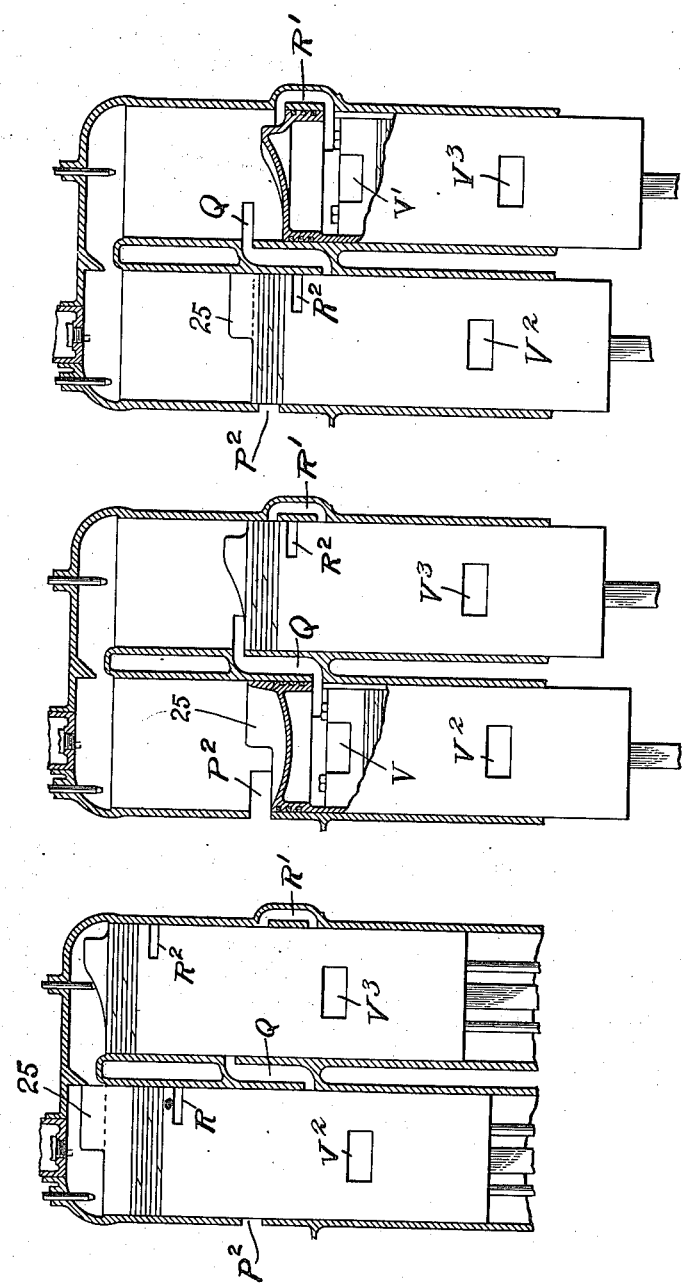

UNITED STATES PATENT OFFICE.

JOHN R. ROGERS, OF BROOKLYN, NEW YORK.

INTERNAL-COMBUSTION ENGINE.

1,239,523.  Specification of Letters Patent.  Patented Sept. 11, 1917.

Application filed July 9, 1912. Serial No. 708,415.

*To all whom it may concern:*

Be it known that I, JOHN R. ROGERS, a citizen of the United States of America, residing in the borough of Brooklyn, county of Kings, and State of New York, have invented certain new and useful Improvements in Internal-Combustion Engines, of which the following is a specification.

My invention relates to internal combustion engines and is described herein in connection with engines of the general type more fully illustrated and described in my application Serial No. 571,142 filed July 9, 1910, although it is as well applicable to internal combustion engines of other types as will be obvious from the following specification:

The present invention has particular relation to improved means for injecting liquid fuel or fuels into the combustion chamber of an internal combustion engine, and has special reference to an arrangement of means by which two or more simultaneous or successive injections of the fuel or fuels into the combustion chamber may be made, whereby fuels of different points of ignition and thermal efficiency may be used in the same cycle of the engine.

Where fuels different in points of ignition and thermal efficiency are used as indicated above, it is possible to use a fuel for the first injection which may be easily ignited by a spark from the ordinary spark plug, or other suitable means, while the second injection, of gas of a higher point of ignition than the first for example, may be made into the heated gas resulting from the firing of the first injection. It is obvious that this second injection may be of the same fuel as the first injection or of one differing from the first in the respects pointed out. In such arrangement the second injection requires no additional means for igniting as it is made into the burning gas resulting from the firing of the first injection and is thus ignited by this burning gas. By the employment of this means a higher thermal efficiency and a greater flexibility may be obtained than is possible in the ordinary internal combustion engine using low compression of say six atmospheres.

In the following I have described with reference to the accompanying drawings, one manner of carrying out my invention, the features thereof being more particularly set forth hereinafter in the claims. The drawings illustrate but one application of the principle of my invention, and I wish it clearly understood that the principle of two or more simultaneous or successive injections of the same or different sorts of fuel may be carried out in many different ways and I do not confine myself to the means indicated in said drawings further than the scope of the appended claims demand.

Figure 10:
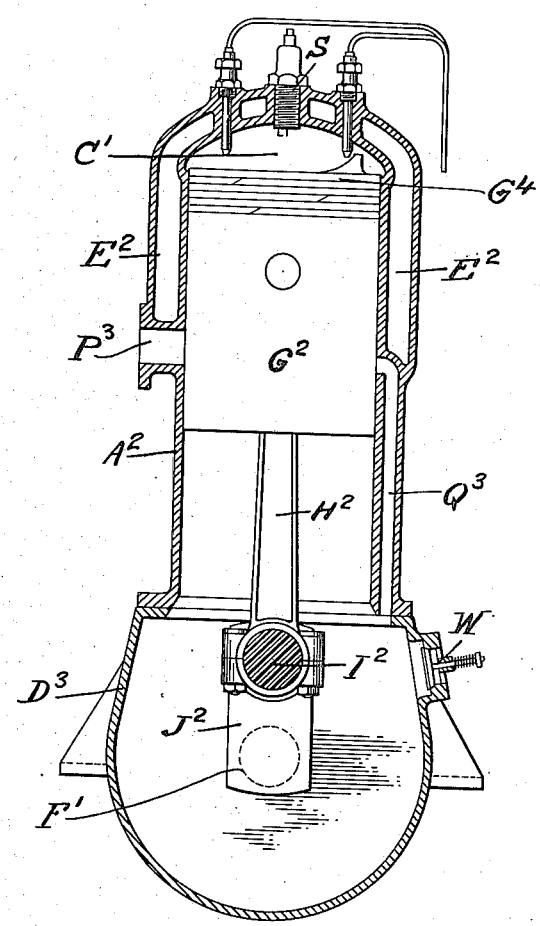

In the drawings Figure 1 is a vertical sectional view on line 1—1 of Fig. 2 looking in the direction of the arrows, of a twin cylinder internal combustion engine of the type illustrated and described in my pending application hereinabove referred to, showing one unit of such engine. The units of course may be multiplied in number as desired. Fig. 2 is a vertical sectional view on line 2—2 of Fig. 1 looking in the direction of the arrows, of the structure shown in Fig. 1. Fig. 3 is an elevation of the engine showing the pumps, cam shaft and a means for varying the throw of the pump pistons. Fig. 4 is a vertical sectional view of one of the pumps used for injecting the fuel. Fig. 5 is a vertical sectional view of one of the nozzles through which fuel is injected into the combustion chamber from the pumps, showing in connection therewith a portion of the engine cylinder. Fig. 6 is a detail end view, partly in section, of the cams for operating the pump pistons showing the cams in position to cause the pumps to make successive injections of the fuel or fuels. By varying the angular positions of the cams with relation to each other on the cam shaft the injections of the fuel or fuels may be made simultaneously or successively as desired. Figs. 7, 8 and 9 are sectional views of the cylinders in diagrammatic form, illustrating the operation of the engine for a cycle. Fig. 10 is a vertical sectional view of a structure illustrating the application of the principle of simultaneous or successive injections of a fuel or fuels to the ordinary two-cycle engine.

Similar letters and numerals of reference indicate similar parts throughout the several views.

A, A' indicate twin cylinders formed of a single casting, the cylinders being separated from each other by a wall B and having a common explosion chamber C at the upper end of the cylinders. D represents a crank case on which the cylinders A, A' are supported and to which they are fastened by any suitable means, such as bolts D', D'. The cylinder casting is provided with water chambers E, E in its walls and the wall B is provided with suitable water chambers E', E'. G, G' indicate the working pistons which are connected by means of suitable cross-heads with connecting rods H, H' mounted on pins I, I' on cranks J, J' on the main shaft F in such manner that a differential motion is communicated to the working pistons. Within working pistons G, G' are mounted stationary pistons K, K' supported on suitable pipes or conduits L, L, L', L' respectively, the pipes or conduits L and L' being suitably mounted in brackets D², D² on the crank case D and in brackets B', B' on the wall B. The stationary pistons K and K' may be made adjustable with relation to their supporting conduits or pipes so as to increase or decrease the size of the compression chambers M, M' formed between the top of working pistons G, G' and stationary pistons K, K', the manner of making such adjustment being more particularly pointed out and described in my pending application hereinabove referred to. P is a chamber in the wall of the lefthand cylinder to act as an exhaust chamber and is connected by a pipe P' to a muffler (not shown) or to the open air. P² is a circumferential slot forming a means of communication between cylinder A and exhaust chamber P. In the wall B between cylinders A and A' is cast a passage Q terminating in grooves Q' and Q² respectively in the walls of cylinders A and A' and forming a means of communication between the two cylinders A and A'. In working piston G there is a port or opening R adapted to register at the lower end of the stroke with groove Q' at one end of the passage Q, so that the contents of the compression chamber M may pass at that time to the righthand cylinder A'. In the wall of the righthand cylinder is formed a passage R' terminating in grooves in the walls of the cylinder, and in working piston G' there is a port or opening R² adapted to register at the lower end of the stroke with the groove at the lower end of passage R' so that the contents of the compression chamber M' may pass over head G³ of working piston G' and into explosion chamber C, as is clearly shown in Fig. 9. S is a spark plug of any suitable construction, T the water inlet for the water-jacket or chamber in the walls of the cylinders and T' the water outlet for the same. V and V' are openings through the walls of the cylinders A and A' adapted to register with corresponding openings V² and V³ in the working pistons G and G' respectively.

1 is a sprocket wheel mounted on a collar 2 fast to crank shaft F. 3 is a sprocket wheel mounted on a collar 4 splined on cam shaft 5 so as to transmit rotary motion to said cam shaft while permitting endwise motion of the cam shaft. Sprockets 1 and 3 are connected by a chain 6. Cam shaft 5 is slidably mounted in bearings 7, 7 which are secured to the cylinders A, A' in any suitable manner. 8 is a handle for transmitting endwise motion to the cam shaft 5. Handle 8 is pivotally mounted in a bearing 9 secured to the crank case in any suitable manner and is provided with a latch 10 adapted to hold the handle in any desired position. The handle is connected to the cam shaft 5 by means of a pin and yoke connection as is clearly shown in Fig. 3. 11 and 12 are cams fast on the cam shaft 5 and as shown in Figs. 3 and 6 the cams are offset with relation to each other so as to cause the successive action of the pumps 13 and 14 respectively. It is obvious that the cams 11 and 12 may be adjusted so that they are in line with each other and thus cause a simultaneous action of the pumps. As these pumps are exactly similar to each other and the particular construction of pump is no part of my invention, I shall but briefly describe one of them, referring in connection therewith to Fig. 4. Each pump comprises a fuel supply inlet 15, the passage through which is controlled by a spring controlled check valve 16 coöperating with a set screw 17 in the usual manner. 18 is the plunger adapted to be operated by the action of the cam on the ball 19, the cam pressing the ball 19 and the plunger upward and the spring 20 returning the plunger to its lowest position in the usual manner. 21 and 22 are spring controlled check valves in the fuel discharge passage, both of which operate in the usual manner. 23 is a pipe connecting the fuel discharge passage with nozzle 24 extending into the combustion chamber C as is clearly shown in Fig. 1, for example.

Fig. 10 illustrates the application of the principle of my invention to an ordinary two-cycle engine adapted for crank case compression in the usual manner. In Fig. 10, A² indicates the cylinder, C' the combustion chamber, D³ the crank case on which the cylinder A² is mounted; E², E² indicate water chambers in the walls of cylinder A², F' indicates the crank shaft, G² indicates the piston connected to the crank shaft by connecting rod H² mounted on pin I² on crank J² on the crank shaft F'. P³ is the exhaust and Q³ is a passage in the wall of cylinder A² to permit the compressed air from the crank case D³ to be discharged over the head G⁴ of the piston G². W indicates a check valve in the crank case D³. S indicates the spark plug and 23, 23 the fuel inlet pipes connected with the pumps (not shown).

As the mode of operation of the type of internal combustion engine illustrated is thoroughly and particularly described in my appliation hereinabove referred to, I shall not here describe the same in detail. It is sufficient to say in so far as the general mode of operation is concerned that the reciprocation of the working pistons G and G', under the force of the explosion in the combustion chamber C, descend uncovering the exhaust slot P² and scavenging the burnt gases from the combustion chamber C by the successive action of the compressed air passing from compression chamber M through passage Q into the righthand cylinder A' and subsequently by the passage of compressed air from the compression chamber M' through the passage R' into the righthand cylinder A' and thence out through the exhaust P², as shown in diagrammatic form in Figs. 8 and 9. Air is supplied to the compression chambers M and M' through openings V and V² and V' and V³ respectively, which are adapted to register when the working pistons are at the limit of their upward stroke, as shown in Fig. 2. The operation of the engine is otherwise clear to those skilled in the art.

Referring now more particularly to the operation of the fuel injection means, it will be noted that gasolene, gas, or any other easily inflammable fuel may be injected into the combustion chamber C through one of the nozzles 24, preferably the one adjacent the spark plug S. In the particular arrangement here described, I use gasolene as a fuel for the first injection. This gasolene is to be injected into the combustion chamber before the piston G reaches its highest point of movement. Just previous to the piston or pistons reaching this highest point, or at any time subsequent to this, the charge of fuel from the nozzle 24 is ignited by a spark from the spark plug S in the usual manner. It will be noted that pistons G, G', are connected to the crank shaft F so that they have a differential movement, with reference to each other, the lefthand piston G reaching its highest point about 45 degrees of the crank throw ahead of the righthand piston G'. It is desirable that the charge should be fired by means of the spark plug S, at such time that the greatest amount of pressure on the piston G will be attained at its extreme upward movement.

As the combustion chambers of the two cylinders A and A' are united into a common chamber C, it is evident that the gas in the entire combustion chamber above both pistons G and G' will be in a state of combustion and will develop a very high degree of heat. If now, a second injection of fuel is made into the righthand cylinder A², Fig. 1, through the righthand fuel supply nozzle, it is evident that this injected fuel will be burned with great rapidity as it is injected into a burning gas having a high degree of heat. It is manifest that the burning of the fuel introduced into this cylinder A' by the second injection will give an additional impulse to the downward or power stroke of both of pistons G and G'. By this means, as shown by the curve on an indicator card, a period of maximum pressure is maintained for a longer time than is possible in the ordinary internal combustion engine of the low compression type, and an indicator curve is obtained resembling that of the well-known engines of high compression type. It is manifest that the best results will be obtained when the second injection of fuel is made at or about the time the righthand piston G' reaches its highest point of travel. This position is shown in diagrammatic form in Fig. 7.

It will also be manifest that inasmuch as the second injection of fuel is made into very hot or incandescent gas that no other means of ignition of said fuel is required and also that fuel of a greater specific gravity and higher ignition point can be used, thereby effecting a very considerable economy in the operation of the engine.

In the engine shown I use kerosene oil for the second injection, using only enough gasolene in the first injection to thoroughly inflame the charge. By this means the consumption of gasolene may be reduced to a minimum and that of the kerosene may be very large in proportion. While it is desirable and economical to use different grades of fuel for the two injections, a very considerable economy and efficiency is effected when the same fuel is used for both injections.

I have hereinabove shown and described an arrangement for injecting the fuel directly into the cylinders and against the piston heads. The exact means or method of injecting the fuel is no part of the present invention, and compressed air for the purpose of atomizing the fuel injected, or other well-known means of accomplishing this result may be used without departing from the spirit of my invention.

I have shown the application of the principle of my invention to a two-cycle engine but it is manifest that by a proper arrangement of the cams with relation to the pumps, the simultaneous or successive injections of the fuel may be made in an engine of the four-cycle type. While I have shown this principle of successive injections as applied to a twin cylinder engine having a common combustion chamber, and while I believe it is most practical and efficient in such an engine, it may also be applied to the ordinary two-cycle engine of the single cylinder type, as shown in Fig. 10.

As the cam shaft 5 is capable of an endwise movement as described and as the cam 11 may be mounted so as to get its maximum throw, without the cam 12 coming into action, it will be manifest that in starting the engine, or when it is desired to run it at low speeds only one injection may be made, but when higher speeds or greater power is required, the cam shaft may be shifted so as to bring the cam 12 into action and to cause the second injection to be made into the cylinder. As the cams may be adjusted on the cam shaft to any desirable relationship to each other, it is obvious that their action may be simultaneous or successive as desired. By this means a very high degree of flexibility is obtained, greater than is now possible in the ordinary automobile engine and rendering it possible by the use of such means to dispense with a large portion of the gears, now required for the different speeds.

The two injections of fuel may be simultaneous, the second being ignited by the first, or the injections may be made where the spark plug will ignite the fuel of both injections. My experiments show, however, that the best results are obtained when the two injections of fuel are in close succession, the second being fired by the first, the second injection of fuel being continued for a longer time than the first and usually being greater in quantity than the first.

It is to be noted that the injections of the fuel or fuels are made at points in the combustion chamber widely separated from each other. I consider this a matter of importance as experiments seem to show that when the first comparatively small injection of the inflammable fuel is made and ignited, the oxygen of the air in the distant part of the combustion chamber is not consumed but said air is compressed and heated so that the second injection of fuel is made into very hot air of high pressure. The oxygen of this air as stated has not been consumed or appreciably diluted by the products of combustion resulting from the explosion in the other part of the combustion chamber but is in the same condition for igniting and completely burning the second injection of fuel as obtains in engines of the well known high compression type, and when I use the phrase "ignited fuel" I means to include within that term air compressed and heated whether in flaming condition or not, as above referred to.

While not necessary, I believe it to be advantageous, especially in motors designed to run at a slow speed, to make a temporary separation between the combustion chambers of the two cylinders.

This may be done in different ways, but I prefer to use a lug or projection on the piston in the cylinder where the first injection is made. This lug or projection, indicated by 25 in Figs. 1 and 2, preferably extends about one half way around the top of the piston, and upwardly from the piston a sufficient distance to substantially close the opening between the two cylinders at the time that the piston is at its highest point.

The injection of the more inflammable fuel and its ignition takes place while the lug or projection makes a separation between the two parts of the combustion chamber. This prevents the flame from shooting into the other part of the combustion chamber, and preserves the oxygen of the second chamber, so that it is free to unite with the second injection of fuel.

Upon the descent of the piston in the first cylinder, the opening between the two parts of the combustion chamber is uncovered, and the heat and pressure from the incandescent gas in the first cylinder, is transmitted to the second cylinder.

It will therefore be seen that if the two injections of fuel into different parts of the combustion chamber are completed while the separation is maintained, and the fuel in one chamber is ignited and said ignited fuel ignites the fuel in the other chamber when the temporary separation is removed, I obtain what is called an "explosive" engine. In this case there are two explosions following one another very closely. It will be noted that after the second explosion takes place the pressure on the pistons will decrease until the end of the stroke or, in other words, the highest pressure will be obtained at the instant of the second explosion.

If however the second injection of fuel is delayed until the temporary separation of the chamber into two parts has been removed, the said second injection of fuel will take place into flaming or burning gas and the pressure on the pistons may be maintained or in some instances increased, so long as the second injection of fuel continues. By this means I obtain what is sometimes termed a "constant-pressure" engine, that is to say, the pressure on the pistons may be at its maximum for a considerable time subsequent to the explosion of the first fuel.

It will thus be seen that by merely varying the time and duration of the second injection of fuel I am able to obtain, with the same means, either an "explosive" or a "constant-pressure" engine.

Where I have referred to low compression engines in both the specification and the claims I mean to include an engine having a maximum compression of not more than eight atmospheres.

What I claim and desire to secure by Letters Patent is:

1. In an internal combustion engine, a combustion chamber, means for making a plurality of injections of fuel into different parts of the combustion chamber during the same cycle and means for temporarily separating said different parts of the combustion chamber from each other.

2. In an internal combustion engine, a combustion chamber, means for making a plurality of successive injections of fuel into different parts of the combustion chamber during the same cycle and means for temporarily separating said different parts of the combustion chamber from each other.

3. In an internal combustion engine, a combustion chamber, means for making a plurality of injections of separate fuels having different ignition points into different parts of the combustion chamber during the same cycle and means for temporarily separating said different parts of the combustion chamber from each other.

4. In a device of the character described, the combination of a low compression engine, means for making a plurality of successive injections of separate fuels having different ignition points into different parts of the combustion chamber of the engine during the same cycle and means for temporarily separating said different parts of the combustion chamber from each other.

5. In a device of the character described, the combination of a low compression engine and means for making a plurality of successive injections of separate fuels having different ignition points into different parts of the combustion chamber of the engine during the same cycle, the fuel having the lowest ignition point being first injected.

6. In an internal combustion engine, means for temporarily separating the combustion chamber into different parts, means for injecting fuel into each of said parts while said separation is maintained, means for igniting the fuel in one of said parts and means for igniting the fuel in another of said parts by said first ignited fuel when said temporary separating means is removed.

7. In an internal combustion engine, means for temporarily separating the combustion chamber into different parts, means for injecting fuels having different points of ignition into said different parts while said separation is maintained, means for igniting the fuel having the lower ignition point and means for igniting the fuel having the higher ignition point by said first ignited fuel when said temporary separating means is removed.

8. In an internal combustion engine, a combustion chamber, means for injecting an inflammable fuel into one part of the combustion chamber, means for igniting the same and means for injecting a less inflammable fuel than the first into another part of the combustion chamber and into said ignited fuel.

9. In a device of the character described, the combination of a low compression engine, a combustion chamber, means for injecting an inflammable fuel into one part of the combustion chamber of the engine, means for igniting the same and means for injecting a less inflammable fuel than the first into another part of the combustion chamber and into said ignited fuel.

10. In an internal combustion engine, a combustion chamber, means for injecting an inflammable fuel into the combustion chamber, means for making a second injection of fuel into another part of the combustion chamber during the same cycle, means for controlling the relative amounts of fuel injected in said several injections and means for temporarily dividing said combustion chamber into a plurality of separate chambers.

11. In an internal combustion engine, a combustion chamber, means for injecting an inflammable fuel into the combustion chamber, means for igniting the same, means for making a subsequent injection of a less inflammable fuel into said ignited fuel, and means for controlling the relative amounts of fuel injected in said several injections and the time relationship of said injections.

12. In an internal combustion engine, the combination of twin cylinders, a common combustion chamber, a piston in each cylinder, means for injecting fuel into the combustion chamber over one piston, means for igniting the same and means for making a second injection of fuel into the combustion chamber over the other piston during the same cycle.

13. In an internal combustion engine, the combination of twin cylinders, a common combustion chamber, a piston in each cylinder, means for injecting fuel into the combustion chamber over one piston, means for igniting the same and means for making a second injection of fuel over the other piston into said ignited fuel.

14. In an internal combustion engine, the combination of twin cylinders, a common combustion chamber, a piston in each cylinder, means for injecting an inflammable fuel into the combustion chamber over one of the pistons, means for igniting the same and means for subsequently making a second injection of a fuel less inflammable than the first over the other piston into said ignited fuel.

15. In an internal combustion engine, the combination of twin cylinders, a common combustion chamber, a piston in each cylinder, means for causing a differential motion of said pistons with relation to each other, means for injecting an inflammable fuel into the combustion chamber over the piston first reaching the highest point of reciprocation, means for igniting said fuel and means for making a second injection of a fuel over the other piston into said ignited fuel.

16. In an internal combustion engine, the combination of twin cylinders, a common combustion chamber, a piston in each cylinder, means for causing a differential motion of said pistons with relation to each other, means for injecting an inflammable fuel into the combustion chamber over the piston first reaching the highest point of reciprocation, means for igniting said fuel and means for subsequently making a second injection of a fuel over the other piston into said ignited fuel.

17. In an internal combustion engine, the combination of twin cylinders, a common combustion chamber, a piston in each cylinder, means for causing a differential motion of said pistons with relation to each other, means for injecting an inflammable fuel into the combustion chamber over the piston first reaching the highest point of reciprocation, means for igniting said fuel and means for subsequently making a second injection of a fuel less inflammable than the first over the other piston into said ignited fuel.

18. In an internal combustion engine, the combination of twin cylinders, a combustion chamber for each cylinder, an opening between said combustion chambers, separate means for injecting fuel into each combustion chamber and means for temporarily closing the opening between said combustion chambers.

19. In an internal combustion engine, the combination of twin cylinders, a combustion chamber for each cylinder, an opening between said combustion chambers, means for injecting fuel into one of the combustion chambers, means for igniting the same, means for subsequently injecting fuel into the other combustion chamber and means for temporarily closing the opening between said combustion chambers.

20. In an internal combustion engine, the combination of twin cylinders, a combustion chamber for each cylinder, an opening between said combustion chambers, means for injecting an inflammable fuel into one of the combustion chambers, means for igniting the same, means for closing the opening between the combustion chambers during the igniting of said fuel and means for injecting a less inflammable fuel than the first into the other combustion chamber and into the ignited fuel.

21. In an internal combustion engine, the combination of two cylinders, a combustion chamber for each cylinder, a passage connecting the two combustion chambrs, a piston in each cylinder, said pistons having a differential motion with relation to each other, and means for igniting the charge in each combustion chamber at substantially the highest point of the stroke of the respective piston.

22. In an internal combustion engine, a combustion chamber, means for temporarily separating said combustion chamber into a plurality of parts, means for causing an explosive combustion in one of said parts and means for causing a comparatively slow-burning combustion in another of said parts during the same cycle whereby a substantially constant pressure is obtained during a portion of the crank shaft motion.

23. In an internal combustion engine, twin cylinders, means for causing an explosive combustion in one of said cylinders and means for injecting and burning a combustible fuel in the other of said cylinders so as to cause a constant pressure during a portion of the crank shaft motion.

24. In an internal combustion engine, twin cylinders, a common combustion chamber, means for injecting and exploding an easily combustible fuel in one of said cylinders and means for injecting and burning, during the same cycle, a less combustible fuel than the first in the other of said cylinders, whereby a substantially constant pressure is caused during a portion of the crank shaft motion.

25. In an internal combustion engine, twin cylinders, a combustion chamber common to both cylinders, means for exploding a combustible fuel in one of said cylinders, means for temporarily separating that portion of the combustion chamber in which said explosion takes place from the other at the time of said explosion and means for injecting and burning a combustible fuel in the other of said cylinders.

In testimony whereof I have signed this specification in the presence of two subscribing witnesses.

JOHN R. ROGERS.

Witnesses:
K. G. LEARD,
SEABURY C. MASTICK.